US011423208B1

(12) United States Patent
McCormick et al.

(10) Patent No.: US 11,423,208 B1
(45) Date of Patent: Aug. 23, 2022

(54) TEXT ENCODING ISSUE DETECTION

(71) Applicant: Amazon Technologies, Inc., Seattle, WA (US)

(72) Inventors: Manolya McCormick, Culver City, CA (US); Muhammad Yahia, Anaheim, CA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 15/826,379

(22) Filed: Nov. 29, 2017

(51) Int. Cl.
*G06F 40/126* (2020.01)
*G06F 16/338* (2019.01)
*G06F 16/33* (2019.01)
*G06F 40/103* (2020.01)
*G06F 40/166* (2020.01)
*G06F 40/232* (2020.01)

(52) U.S. Cl.
CPC .......... *G06F 40/126* (2020.01); *G06F 16/338* (2019.01); *G06F 16/3343* (2019.01); *G06F 40/103* (2020.01); *G06F 40/166* (2020.01); *G06F 40/232* (2020.01)

(58) Field of Classification Search
CPC .... G06F 17/22; G06F 40/126; G06F 16/3343; G06F 16/338; G06F 40/103; G06F 40/166; G06F 40/232
USPC ......................................................... 715/234
See application file for complete search history.

(56) References Cited

U.S. PATENT DOCUMENTS 5,793,381 A * 8/1998 Edberg ................ G06F 17/2223
345/467
5,819,265 A * 10/1998 Ravin ................. G06F 17/2755

7,424,675 B2 * 9/2008 Lee ..................... G06F 17/2223
704/1
8,543,395 B2 * 9/2013 Todic ..................... G10L 15/05
704/10
8,914,278 B2 * 12/2014 Zangvil ................ G06F 17/273
382/177

(Continued)

OTHER PUBLICATIONS

© 2017 GitHub, Inc., "LuminosoInsight/ python-ftfy", retrieved on Dec. 5, 2017 at <https://github.com/LuminosoInsight/python-ftfy>, 3 pages.

(Continued)

*Primary Examiner* — Andrew R Dyer
*Assistant Examiner* — Tionna M Burke
(74) *Attorney, Agent, or Firm* — Patterson + Sheridan, LLP

(57) ABSTRACT

Method and apparatus for detecting text encoding errors caused by previously encoding the electronic document in multiple encoding formats. Non-word portions are removed from the electronic document. Embodiments determine whether words in the electronic document are likely to contain one or more text encoding errors, by dividing the first word into n-grams of length 2 or more. For each of the plurality of n-grams, a database is queried to determine a respective probability of the n-gram appearing in each of a plurality of recognized languages, and upon determining that the determined probabilities of two consecutive n-grams are each less than a predefined threshold probability, the first word is added to a list of words that likely contain text encoding errors. A confidence level that the first word includes the one or more text encoding errors is calculated, based on a lowest determined probably for the n-grams for the first word.

20 Claims, 8 Drawing Sheets

(56) References Cited

U.S. PATENT DOCUMENTS 10,073,673 B2 * 9/2018 Brancovici ......... G06F 17/2785

OTHER PUBLICATIONS

© 2017 GitHub, Inc., © 2011-2015 David Kellum, "dekellum/mojibake", retrieved on Dec. 5, 2017 at <https://github.com/dekellum/mojibake>, 2 pages.

* cited by examiner

TEXT ENCODING ISSUE DETECTION

BACKGROUND

The present invention relates to electronic document processing, and more specifically, to techniques for processing electronic documents to detect text encoding issues resulting from previously encoding and decoding the electronic documents in multiple different encoding formats.

Mojibake is a historically Japanese term that translates as garbled characters. In the electronic document context, text within electronic documents can become garbled when an electronic document was encoded using one encoding format and then was decoded as if the document were encoded using a different encoding format. This could occur due to one or more tags associated with the electronic document (e.g., within a header of the electronic document, within metadata describing the electronic document, etc.) tagging the electronic document with the wrong encoding format. As another example, the document could be decoded using the wrong format when the document was not originally tagged at all, leaving the decoder application to guess as to which encoding format was used. As yet another example, the document could be decoded using a different format when the decoding application is simply not configured to decode documents encoded in the particular encoding that the electronic document is encoded in, and/or the decoding application wrongly assumed that the electronic document was in another encoding than it originally was. In any event, when the document is decoded in the wrong format, this can result in erroneous characters being introduced into the document.

Current solutions for detecting such erroneous characters rely on manual interventions by administrators. As a result, these solutions are not easily scalable and can be impractical for processing a large corpus of documents. Moreover, many of these conventional solutions only support a limited number of language and encoding formats, which can limit their effectiveness in processing certain types of documents. While such conventional solutions can be effective in correcting errors caused by encoding and decoding documents between select formats, these conventional solutions are not capable of processing a large corpus of documents (e.g., an ever-expanding set of documents containing sub-title text for an online video streaming site) which may have been previously encoded (and erroneously decoded) in any number of different formats and languages.

DETAILED DESCRIPTION

Figure 1:
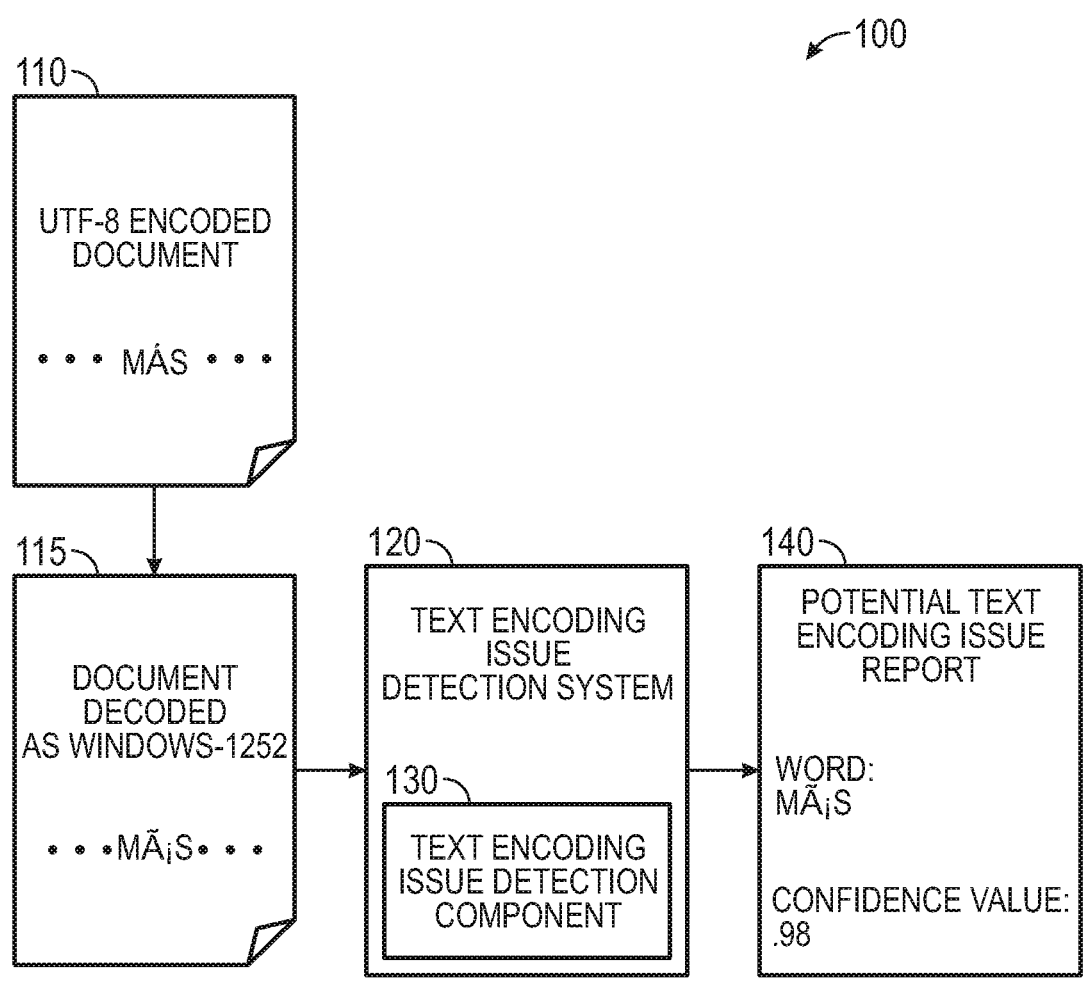
FIG. 1 illustrates a workflow for detecting a text encoding issue with an electronic document, according to one embodiment described herein.

Embodiments described herein provide techniques for detecting encoding issues that arise when a given electronic document is created using one encoding format and is subsequently decoded using a different encoding format. These encoding issues can result in the creation of garbled characters (commonly referred as mojibake) within the electronic document. When such mojibake appears in sub-titles or metadata, this can negatively impact the customer experience, as errors can be introduced into the text (e.g., sub-titles), even though the text may have originally been error-free and could have already been proofread to determine that no errors exist within the text.

Current solutions for detecting and correcting mojibake characters within electronic documents are limited to a small set of known mojibake. For example, such solutions can scan a document for predefined strings of text that are recognized as mojibake. However, such solutions rely on manual interventions by administrators for recognizing new mojibake, and as a result such solutions are not scalable. That is, for such solutions to recognize a string of text as mojibake, a user must add such a string to the list of predefined strings of text. While such solutions may be suitable for detecting the most common strings of mojibake, the requirement that users first manually detect a given string of mojibake makes these solutions unsuitable for large-scale document processing and also renders these solutions less suitable for detecting more obscure strings of mojibake.

As such, embodiments described herein provide an automated solution to detect and fix mojibake within electronic documents to reduce manual overhead and improve customer experience. Generally, the disclosed solution combines machine learning techniques with deterministic algorithms to identify words with mojibake. More specifically, embodiments described herein provide techniques for detecting mojibake within electronic documents using n-grams. As used herein, an n-gram is a contiguous sequence of n characters from a given sequence of text or speech. One embodiment described herein used n-grams of size 2, which are referred to as bigrams. For example, the word "hello" would have the set of characters of ["he", "el", "ll", "lo"] as bigrams.

Embodiments can check each of the bigrams against a repository (e.g., a database) of bigrams for supported languages to determine the frequency of said bigram per language. For instance, the frequency could be calculated as a ratio of number of times the bigram occurs in the given language over the total number of bigrams in that language in the repository. As an example, the repository could be generated by processing a large corpus of documents in the supported languages, and could store data in the repository on the number of times each bigram occurs in the documents within the corpus across the various supported languages.

Generally, if mojibake exists in a given word, the resulting bigrams containing the mojibake characters will have 0 or very low frequency in the database.

Generally, using n-grams for the analysis (e.g., as opposed to unigrams) provides more context when processing the various portions of the word. For example, a perfectly valid letter in Portuguese, Ã in SEÇÃO, can be mojibake when appearing in a French word, protÃgÃ (protégé). By analyzing the procession of the letters in a word in an electronic document, embodiments can infer possible errors within the characters of the word. In one embodiment, trigrams (i.e., portions of size 3) are used, which can increase recall (although potentially at the cost of precision). In a particular embodiment, a hybrid approach is used where embodiments combine the n-gram frequency of one or more sizes (e.g., bigram frequency) with regular expressions to identify known mojibake patterns.

In one embodiment, an electronic document is analyzed on a per-word basis. In a particular embodiment, it is not assumed that any given word in the input will be a part of the dominant language for the entire text, which can ensure support for input text with mixed languages. For example, a document that is primarily in the English language may still include one or more French words. In a particular embodiment, the document is preprocessed in order to remove one or more non-word portions, prior to dividing each word into n-grams. For example, a preprocessing operation could be performed to remove punctuation characters from the electronic document (e.g., commas, periods, and so on). Moreover, any hyphen characters used to hyphenate words within the electronic document could be removed from the document, and the hyphenated word could then be divided into two separate words for further processing as n-grams.

FIG. 1 illustrates a workflow for detecting a text encoding issue with an electronic document, according to one embodiment described herein. As shown, the workflow 100 illustrates a first electronic document 110 that is encoded in the UTF-8 encoding format and a second document 115 illustrating the first electronic document 110 decoded using the Windows-1252 encoding format. In the depicted example, the first electronic document 110 includes the word "más", and when the first electronic document 110 is decoded using the Windows-1252 format, this results in the mojibake "mÃ¡s". More specifically, in the UTF-8 encoding format, the word "más" is represented using the hexadecimal values "6D C3 A1 73", where the character "m" is represented as "6D", "á" is represented as "C3 A1" and "s" is represented as "73". However, when this hexadecimal string is decoded using the Windows-1252 encoding, the hexadecimal values "C3" corresponds to the character "Ã" and "A1" corresponds to the character "¡". As discussed above, the document could be decoded using a different encoding format when, for example, the electronic document is tagged incorrectly, when the electronic document is not tagged at all, when the decoding application is not configured to recognize the original format (i.e., UTF-8, in the depicted example), and so on.

In the depicted embodiment, the second document 115 containing the textual encoding error "mÃ¡s" is processed by a text encoding issue detection system 120 in order to identify the text encoding error within the second document 115. More specifically, a text encoding issue detection component 130 could divide each word within the document into a plurality of n-grams and could determine a probability that each n-gram appears within a plurality of recognized languages. For example, the text encoding issue detection component 130 could divide the word "mÃ¡s" into three bigrams "mÃ", "Ã¡" and "¡s", and could determine a probability for each of the bigrams. The text encoding issue detection component 130 could then determine whether the probabilities for one or more of the bigrams satisfy predefined criteria for detecting text encoding issues. For example, the text encoding issue detection component 130 could determine whether the probabilities for two consecutive bigrams are less than a predefined threshold, and if so, could determine that the corresponding word contains a text encoding issue. By considering bigrams in context of surrounding bigrams, embodiments can consider more information than assessing each bigram individually, which can result in an increase in both precision and recall.

In one embodiment, the first and last bigrams in a word are still assessed individually. In a particular embodiment, the text encoding issue detection component 130 is configured to assess the first and last bigrams for a given word in the context of the bigrams beginning or ending a word in the recognized languages. For example, the text encoding issue detection component 130 could determine the probability of the bigram "mÃ" beginning a word across the recognized languages, and could determine the probability of the bigram "¡s" ending a word across the recognized languages.

Generally, the text encoding issue detection component 130 can consider each word in isolation and without considering the overall dominant language of the document. That is, while the text of an electronic document may primarily be written in the English language, the text may include one or more words in other languages. In one embodiment, the text encoding issue detection component 130 is configured to consider the bigrams that make up a given word as belonging to the same language. As such, when determining the bigram probabilities, the text encoding issue detection component 130 can consider which language of the recognized languages produces the highest overall probabilities for the bigrams. In another embodiment, the text encoding issue detection component 130 is configured to consider each bigram in isolation and determines the highest probability of the bigram appearing in any language out of the recognized languages.

For example, in determining the probabilities, the text encoding issue detection component 130 can query a database containing probability data for bigrams appearing within documents in multiple supported languages. For example, the probability could be calculated as a ratio of number of times the bigram occurs in the given language across a corpus of documents over the total number of bigrams in that language in the database. Once the text encoding issue detection component 130 determines the probabilities for each of the bigrams, the text encoding issue detection component 130 can determine whether the word being considered is likely to contain mojibake. For example, the text encoding issue detection component 130 could use the lowest bigram frequency as the measure of confidence in each word being mojibake or not. In one embodiment, the text encoding issue detection component 130 calculates the confidence vale by interpolating between the probability of a word being detected as mojibake versus probability of this word not being mojibake. The text encoding issue detection component 130 could then generate the potential text encoding issue report 140. For example, in the depicted embodiment, the text encoding issue detection component 130 has determined that the word "mÃ¡s" is likely to contain mojibake and has determined a confidence value of 0.98 for this conclusion.

Figure 2:
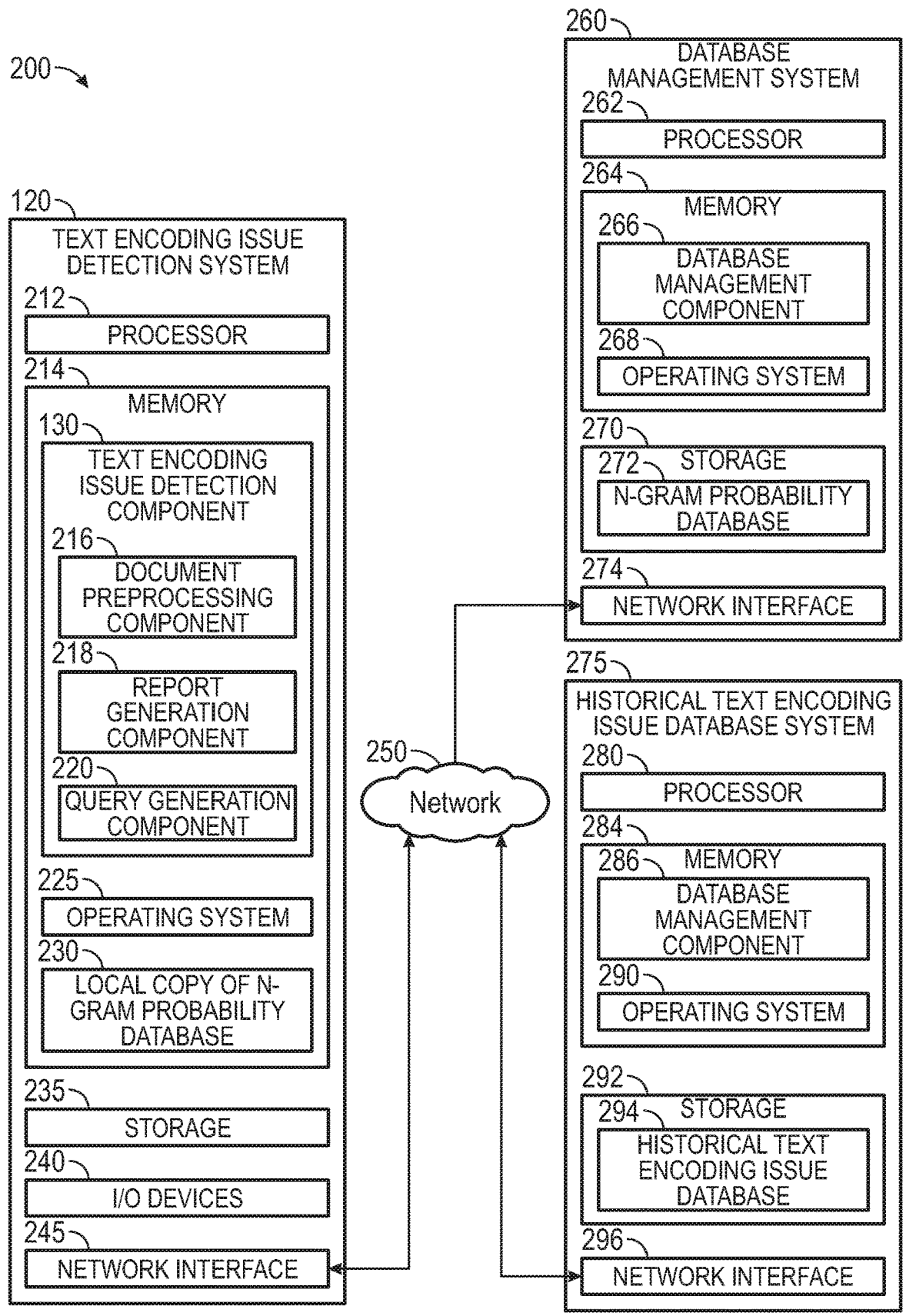
FIG. 2 is a block diagram illustrating a system configured with a text encoding issue detection component, according to one embodiment described herein.

FIG. 2 is a block diagram illustrating a system configured with a text encoding issue detection component, according to one embodiment described herein. As shown, the system 200 includes a text encoding issue detection system 120, a database management system 260 and a historical text encoding issue database system 275, interconnected via network 250. Generally, the network 250 represents any data communications network via which the text encoding issue detection system 120 and database management system 260 can communicate. Examples of the network 250 include a local area network, a wide-area network (e.g., the Internet).

The text encoding issue detection system 120 includes a processor 212, memory 214, storage 235, I/O devices 240, and a network interface 245. Processor 212 is intended to be representative of a single CPU, multiple CPUs, a single CPU having multiple processing cores, and the like. The memory 214 is included to be representative of a random access memory. As shown, memory 214 includes the text encoding issue detection component 130, an operating system 225 and a local copy of an n-gram probability database 230. The text encoding issue detection component 130 includes a document preprocessing component 216, a report generation component 218 and a query generation component 220. Generally, the document preprocessing component 216 is configured to perform a preprocessing operation on electronic documents processed by the text encoding issue detection component 130. Such a preprocessing operation could be performed, for example, prior to performance of an n-gram based analysis on the electronic document to detect textual errors within the electronic document. The report generation component 218 is generally configured to process the results of the text encoding issue detection and to generate a report through which these results can be coherently output to a user. The query generation component 220 is configured to generate and submit queries to the database management system 260 (e.g., to determine the greatest probability of a given n-gram appearing across a plurality of recognized languages).

The storage 235 may be a disk drive storage device. Although shown as a single unit, the storage 235 may be a combination of a fixed and/or removable storage, such as fixed disc drives, removable memory cards, optical storage, network attached storage (NAS), or storage-area-network (SAN). The network interface 245 may be any type of network communications allowing the text encoding issue detection system 120 to communicate with other computers via a data communications network (e.g., network 250).

The database management system 260 generally includes a processor 262, a memory 264, storage 270 and a network interface 274. Processor 262 is intended to be representative of a single CPU, multiple CPUs, a single CPU having multiple processing cores, and the like. The memory 264 is included to be representative of a random access memory. As shown, the memory 264 includes a database management component 266 and an operating system 268. Generally, the database management component 266 provides an interface through which queries can be received and executed against the n-gram probability database 272. The storage 270 may be a disk drive storage device. Although shown as a single unit, the storage 270 may be a combination of a fixed and/or removable storage, such as fixed disc drives, removable memory cards, optical storage, network attached storage (NAS), or storage-area-network (SAN). The network interface 274 may be any type of network communications allowing the database management system 260 to communicate with other computers via a data communications network (e.g., network 250).

The historical text encoding issue database system 275 generally includes a processor 280, a memory 284, storage 292 and a network interface 296. Processor 280 is intended to be representative of a single CPU, multiple CPUs, a single CPU having multiple processing cores, and the like. The memory 284 is included to be representative of a random access memory. As shown, the memory 284 includes a database management component 286 and an operating system 290. Generally, the database management component 286 provides an interface through which queries can be received and executed against the historical text encoding issue database 294. The historical text encoding issue database 294 contains data describing historical processing operations performed by the text encoding issue detection component 130. For example, the historical text encoding issue database 294 could store the results of the historical processing operations, performance metrics describing the execution of the historical processing operations, and the like. The storage 292 may be a disk drive storage device. Although shown as a single unit, the storage 292 may be a combination of a fixed and/or removable storage, such as fixed disc drives, removable memory cards, optical storage, network attached storage (NAS), or storage-area-network (SAN). The network interface 296 may be any type of network communications allowing the historical text encoding issue database system 275 to communicate with other computers via a data communications network (e.g., network 250).

Generally, the text encoding issue detection component 130 can process an electronic document to determine whether any words within the electronic document are likely to contain text encoding errors (or mojibake). In doing so, the document preprocessing component 216 could remove one or more non-word portions from the electronic document, such as punctuation characters between words of the document, hyphen characters separate words within the document, and so on. The text encoding issue detection component 130 could then determine whether each of the remaining plurality of words is likely to contain one or more text encoding errors. For instance, the text encoding issue detection component 130 could divide each word within the document into a respective plurality of n-grams of a fixed length. For example, the text encoding issue detection component 130 could divide each word into n−1 bigrams, where n is the total number of characters within the word, and each bigram represents a consecutive sequence of characters within the word.

For each of the plurality of n-grams, the text encoding issue detection component 130 could determine a greatest probability of the respective n-gram appearing within one of a plurality of recognized languages. For example, the query generation component 220 could generate a query that, when executed, determines a probability of a specified n-gram appearing within each of the plurality of recognized languages, and then returns the greatest determined probability as the query results 238. The query generation component 220 could then execute such a query against the local copy of an n-gram probability database 230. Generally, the local copy of an n-gram probability database 230 represents a copy of the n-gram probability database 272 that has been downloaded from the database management system 260 (e.g., by the text encoding issue detection component 130) and stored in the memory 214 of the text encoding issue detection system 120. Generally, the n-gram probability database 272 contains a listing of each previously seen bigram (e.g., each expressed on a respective row of the database) and, for each previously seen bigram, a probability of the bigram appearing in each of a plurality of recognized languages (e.g., with each recognized language represented as a respective column). More generally, however, any database topology could be used for storing such probability data. In one embodiment, the n-gram probability database 272 is generated by processing a large corpus of documents of various languages and recording bigram probability in each of the languages across the corpus of documents.

Upon determining the respective probability of the n-gram appearing in each of a plurality of recognized languages, the text encoding issue detection component 130 can determine whether one or more of the probabilities satisfy one or more predefined criteria. For example, the text encoding issue detection component 130 could determine whether the probabilities for two consecutive n-grams are each less than a predefined threshold probability. Upon determining that the probabilities for a particular word satisfy the predefined criteria, the text encoding issue detection component 130 could add the word to a list of words that likely contain one or more text encoding errors. Moreover, the text encoding issue detection component 130 could calculate a confidence level that the word includes the one or more text encoding errors, based on a lowest determined probably for the n-grams for the word. The report generation component 220 could then generate a report specifying at least the list of words and their corresponding confidence levels for output to a user. The text encoding issue detection component 130 could then write data associated with the processing of the electronic document to the historical text encoding issue database 294 (e.g., by submitting a database query to the database management component 286 over the network 250).

Figure 3:
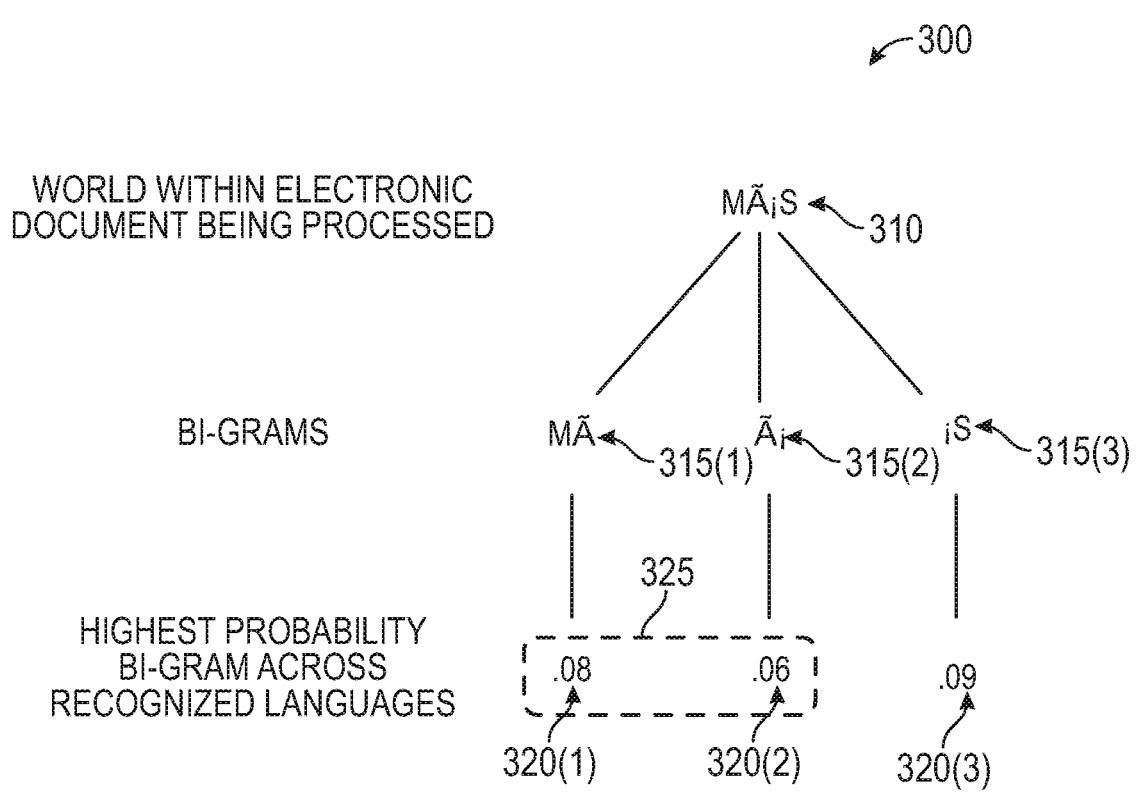
FIG. 3 illustrates a workflow for detecting a text encoding issue by dividing a word into n-grams, according to one embodiment described herein.

FIG. 3 illustrates a workflow for detecting a text encoding issue by dividing a word into n-grams, according to one embodiment described herein. As shown, the workflow 300 illustrates the text encoding issue detection component 130 processing the word "mÃ¡s" 310. As shown, the text encoding issue detection component 130 divides the word into bigrams 315(1)-(3), resulting in the bigrams "mÃ", "Ã¡" and "¡s". The text encoding issue detection component 130 determines the highest probability for each of the bigrams occurring in one of the recognized languages, as shown by probabilities 320(1)-(3). For example, the text encoding issue detection component 130 could determine a respective probability for a given bigram occurring in each of a plurality of recognized languages, and the text encoding issue detection component 130 could then select the highest of the determined probabilities to be evaluated against the predefined criteria.

In the depicted embodiment, the text encoding issue detection component 130 is configured to determine whether a consecutive two or more of the bigram probabilities 320(1)-(3) fall below a predefined threshold. As shown by the selection 325, the text encoding issue detection component 130 has determined that the probabilities 320(1) and 320(2) have fallen below a predefined threshold level of 0.20. As a result, the text encoding issue detection component 130 in the depicted example could determine that the word 310 contains mojibake. As a result, the text encoding issue detection component 130 could add the word 310 to a list of words that are likely to contain mojibake and could include such a list in a generated report.

Of note, while the text encoding issue detection component 130 in the depicted embodiment considers whether two consecutive bigram probabilities 320(1)-(3) are less than a predefined threshold level, more generally any defined criteria could be used to construe the bigram probabilities 310(1)-(3). For example, the text encoding issue detection component 130 could construe the probabilities individually against a predefined threshold level of probability, the text encoding issue detection component 130 could consider neighboring bigrams on either side of a given bigram (e.g., where the probabilities of three consecutive bigrams are less than a predefined threshold), and so on. As such, the depicted example is provided for illustrative purposes only and without limitation.

Figure 4:
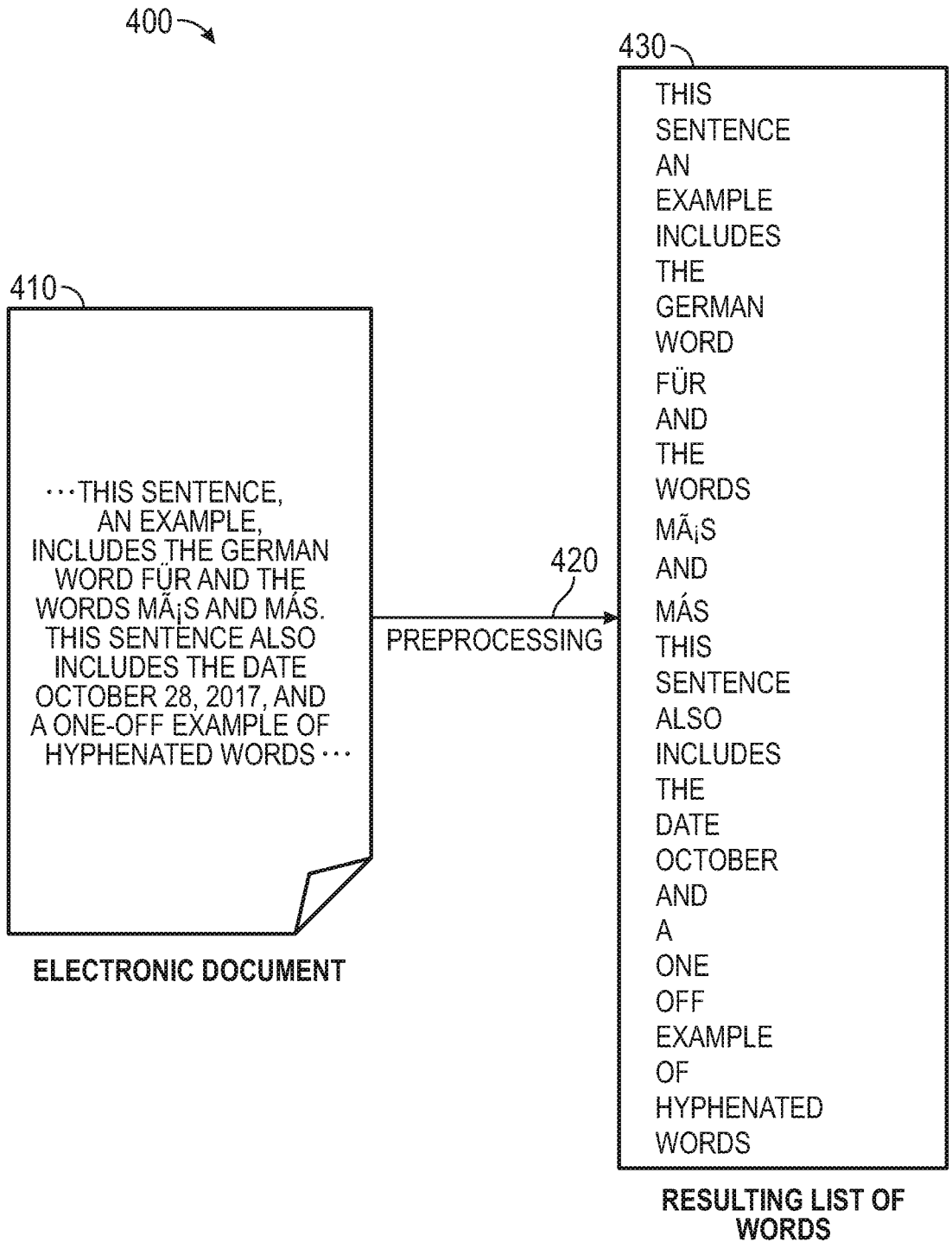
FIG. 4 illustrates a workflow for preprocessing an electronic document to remove non-word portions, according to one embodiment described herein.

As discussed above, the text encoding issue detection component 130 can be configured to perform a preprocessing operation on a document, prior to performing an n-gram based analysis on the words within the document. An example of such a preprocessing operation is shown in FIG. 4, which illustrates a workflow for preprocessing an electronic document to remove non-word portions, according to one embodiment described herein. As shown, the workflow 400 illustrates an electronic document 410 that includes, at least in part, the depicted sentence. Generally, the document preprocessing component 216 can process the electronic document 410, prior to the n-gram based analysis, to remove characters that are not relevant to the n-gram based analysis. For example, punctuation characters such as "," and "." used between words generally operate in the same way regardless of the language in which the document's text is written. As such, the document preprocessing component 216 can remove these characters prior to the performance of the n-gram based analysis to identify mojibake within the document.

In one embodiment, the document preprocessing component 216 is configured to filter select characters out of the electronic document 410, where the select characters satisfy one or more predefined conditional expressions. For instance, such predefined conditional expressions could be configurable by one or more administrators of the text encoding issue detection system 120 and could be stored electronically (e.g., in an XML, file, in a database, etc.) for retrieval by the document preprocessing component 216. For example, one such conditional expression could specify to remove the characters "," and "." occurring before and after words, but not to filter the characters "," and "." if occur within a word, as such mid-word occurrences could be indicative of mojibake within the document. As another example, the document preprocessing component 216 could specify to remove the character "-" separating two parts of a single word and to split the two parts into separate words for the n-gram based processing. In the depicted example, the hyphenated word "one-off" has been separated into the words "one" and "off" and the "-" character has been removed. As another example, another conditional expression could specify to remove dates and other numerical characters from the document during the preprocessing operation 420. For example, in the depicted example, in preprocessing the date of "Oct. 28, 2017" the document preprocessing component 216 has added the word "October" to the list of words 430, while the characters "," and "2016" have been filtered out.

Accordingly, in the depicted example, the document preprocessing component 216 has performed a preprocessing operation 420 on the electronic document 410 and has generated the resulting list of words 430. In doing so, the document preprocessing component 216 has removed the "," and "." characters appearing between words in the electronic document 410. The text encoding issue detection component 130 could then perform an n-gram based analysis on the resulting list of words 430, to detect any instance of mojibake within the electronic document 410.

In one embodiment, the document preprocessing component 216 could filter any words from the electronic document 410 that are composed entirely of American Standard Code for Information Interchange (ASCII) characters. That is, in such an embodiment, because ASCII characters may be universally represented using the same characters across different encoding formats, the text encoding issue detection component 130 can be configured to exclude words composed entirely of these characters from further consideration, thereby greatly reducing the time and computing resources required to process select documents. For example, in the depicted electronic document 410, the document preprocessing component 216 could generate a list of words 430 that only contains the words "für", "mÃ¡s", and "más", as each of these words contains at least one character that is not an ASCII character. Doing so can significantly reduce the number of words that the text encoding issue detection component 130 performs the n-gram based detection operation on.

In some instances, the document preprocessing component 216 can perform a normalization operation on the electronic document 410. For instance in many cases, a character can be represented in Unicode by several code sequences. For example, the Greek small letter alpha with dasia and oxia and ypogegrammeni can be written as U+1F85 (ᾅ), or U+1F05 U+0345 (ἅ), or U+1F81 U+0301 (ᾅ), . . . , or U+03B1 U+0314 U+0301 U+0345 (ἅ), where the start of the sequence gives the main symbol, and the following Unicode values indicate combining diacritics. Generally, all such sequences representing the same character can be called canonically equivalent. In one embodiment, the document preprocessing component 216 is configured to standardize the representation of data across the electronic documents being analyzed. For example, the document preprocessing component 216 could use one of the four standard normalization forms provided by the Unicode Consortium, e.g., Normalization Form C (NFC). Using NFC, the document preprocessing component 216 can convert all canonically equivalent character sets into a single code point representation. In one embodiment, the document preprocessing component 216 can use NFC to normalize all text used to create the n-gram database, as well as all electronic documents being analyzed for mojibake detection before the documents are converted into n-grams.

Figure 5:
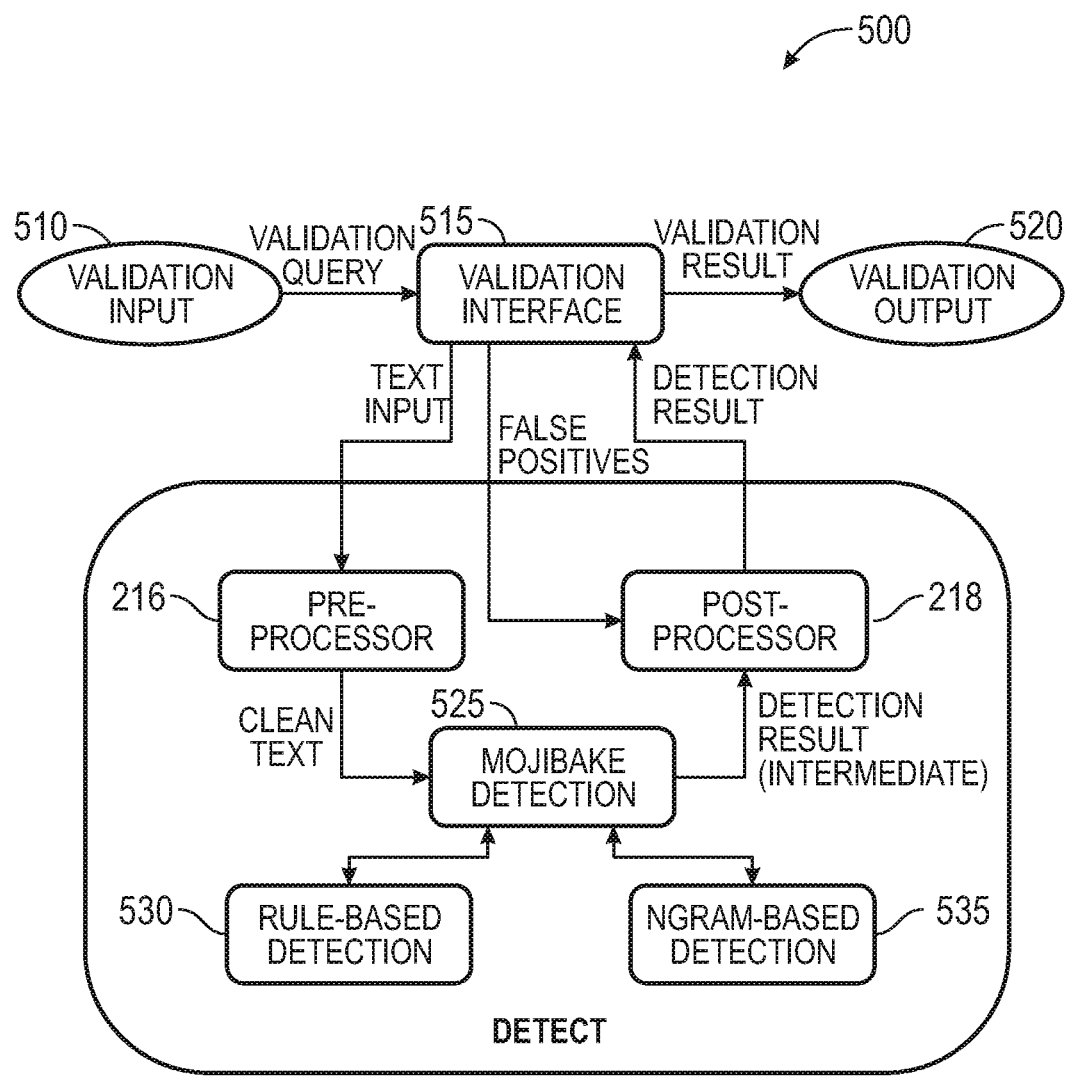
FIG. 5 illustrates a system configured with a text encoding issue detection component for generating reports on detected text encoding issues, according to one embodiment described herein.

FIG. 5 illustrates a system configured with a text encoding issue detection component for generating reports on detected text encoding issues, according to one embodiment described herein. As shown, the system 500 includes a validation input 510 (e.g., an electronic document, content identifiers, etc.) being passed to a validation interface 515 via a validation query. Generally, the validation interface 515 represents an Application Programming Interface (API) through which text-based content can be submitted to the text encoding issue detection component 130 for analysis. Upon receiving the validation input 510, the validation interface 515 can provide the text-based input to the text encoding issue detection component 130, where a document preprocessing component 216 performs a preprocessing operation on the text-based input. For example, as discussed above, the text encoding issue detection component 130 could remove one or more characters (e.g., punctuation characters) from the text-based input that satisfy one or more predefined conditional expressions.

Once the preprocessing operation is complete, the text encoding issue detection component 130 performs a mojibake detection operation on the preprocessed content to determine whether any words within the preprocessed content are likely to contain mojibake. In the depicted example, in performing the mojibake detection operation, the text encoding issue detection component 130 performs both a rule-based detection operation 530 and an n-gram based detection operation 535 for detecting text encoding errors within the preprocessed content. For example, in performing the rule-based detection operation 530, the text encoding issue detection component 130 could determine whether any words within the preprocessed content satisfy one or more regular expressions or rules to determine whether the words are included on a list of known mojibake.

In performing the n-gram based detection operation 535, the text encoding issue detection component 130 could determine whether each of a plurality of words within the preprocessed content is likely to contain one or more text encoding errors by first dividing the word into a plurality of n-grams of a fixed length. For instance, the text encoding issue detection component 130 could divide the word into n−1 bigrams, where n is the total number of characters in the word.

For each of the plurality of n-grams, the query generation component 220 could generate a query and could submit the query for execution against a database (e.g., a local copy of an n-gram probability database) to determine a respective probability of the n-gram appearing in each of a plurality of recognized languages. Upon determining that the determined probabilities of two consecutive n-grams are each less than a predefined threshold probability, the text encoding issue detection component 130 could add the first word to a list of words that likely contain one or more text encoding errors. Additionally, the text encoding issue detection component 130 could calculate a confidence level that the first word includes the one or more text encoding errors, based on a lowest determined probably for the n-grams for the first word.

The text encoding issue detection component 130 then performs a postprocessing operation 553 on the results of the mojibake detection operation 525. As an example, any words flagged as mojibake by the n-gram based detection operation 535 could be further analyzed under the rule-based detection operation 530 to eliminate any false positives. For instance, a particular word may contain bigrams that are uncommonly used in the recognized languages, and thus may be flagged as mojibake by the n-gram based detection operation 535. However, the text encoding issue detection component 130 could then perform the rule-based detection operation 530 and could determine that the particular word is included on a list of known false positives. As a result, the text encoding issue detection component 130 could omit the particular word from any reports listing potential mojibake within the input content.

In one embodiment, the report generation component 218 can generate a report describing the results of the postprocessing operation 553. Generally, the report generation component 218 is configured to prepare the results of the mojibake detection operation 525 into a coherent output for a user. For example, the report generation component 218 could generate a comma-separated values (CSV) report. For example, where the textual content comprises subtitle data for an online stream video service, the CSV report could contain an indication of the content identifier that was processed, a title of the content associated with the content identifier, a marketplace and a vendor associated with the content, an excerpt from the textual content corresponding to the detected mojibake (e.g., a sentence in which the mojibake was detected), a list of words that the text encoding issue detection component 130 determined were likely to contain mojibake, and a determined confidence value for each of the words. Such a report could, for example, be returned to a requesting entity from which the validation query was received as the validation output 520.

Figure 6:
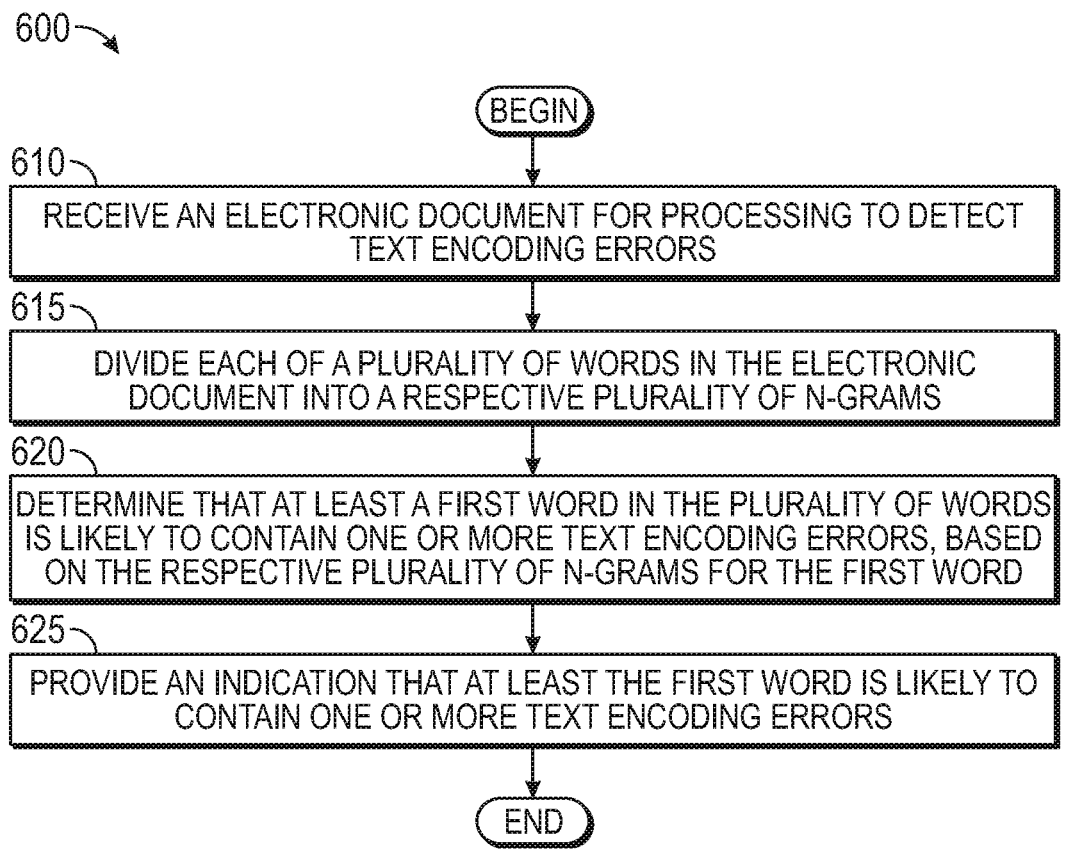
FIG. 6 is a flow diagram illustrating a method of identifying a text encoding issue in an electronic document, according to one embodiment described herein.

FIG. 6 is a flow diagram illustrating a method of identifying a text encoding issue in an electronic document, according to one embodiment described herein. As shown, the method 600 begins at block 610, where the text encoding issue detection component 130 receives an electronic document for processing to detect text encoding errors. For example, the text encoding issue detection component 130 could receive the electronic document in response to a query submitted through an API (e.g., the validation interface 510).

The text encoding issue detection component 130 divides each of a plurality of words in the electronic document into a respective plurality of n-grams (block 615). The text encoding issue detection component 130 further determines that at least a first word in the plurality of words is likely to contain one or more text encoding errors, based on the respective plurality of n-grams for the first word (block 620). For example, the text encoding issue detection component 130 could determine a respective probability that each of the plurality of n-grams appears in one of a plurality of recognized languages, and could determine that the first word is likely to contain mojibake, in response to the determined probabilities satisfying one or more predefined criteria (e.g., two consecutive probabilities being less than a predefined threshold). The text encoding issue detection component 130 provides an indication that at least the first word is likely to contain one or more text encoding errors (block 625), and the method 600 ends. For example, the report generation component 218 could generate report specifying the detected text encoding error, a context in which the text encoding error appears, and a confidence value indicating the text encoding issue detection component's 130 confidence in the text encoding error determination.

Figure 7:
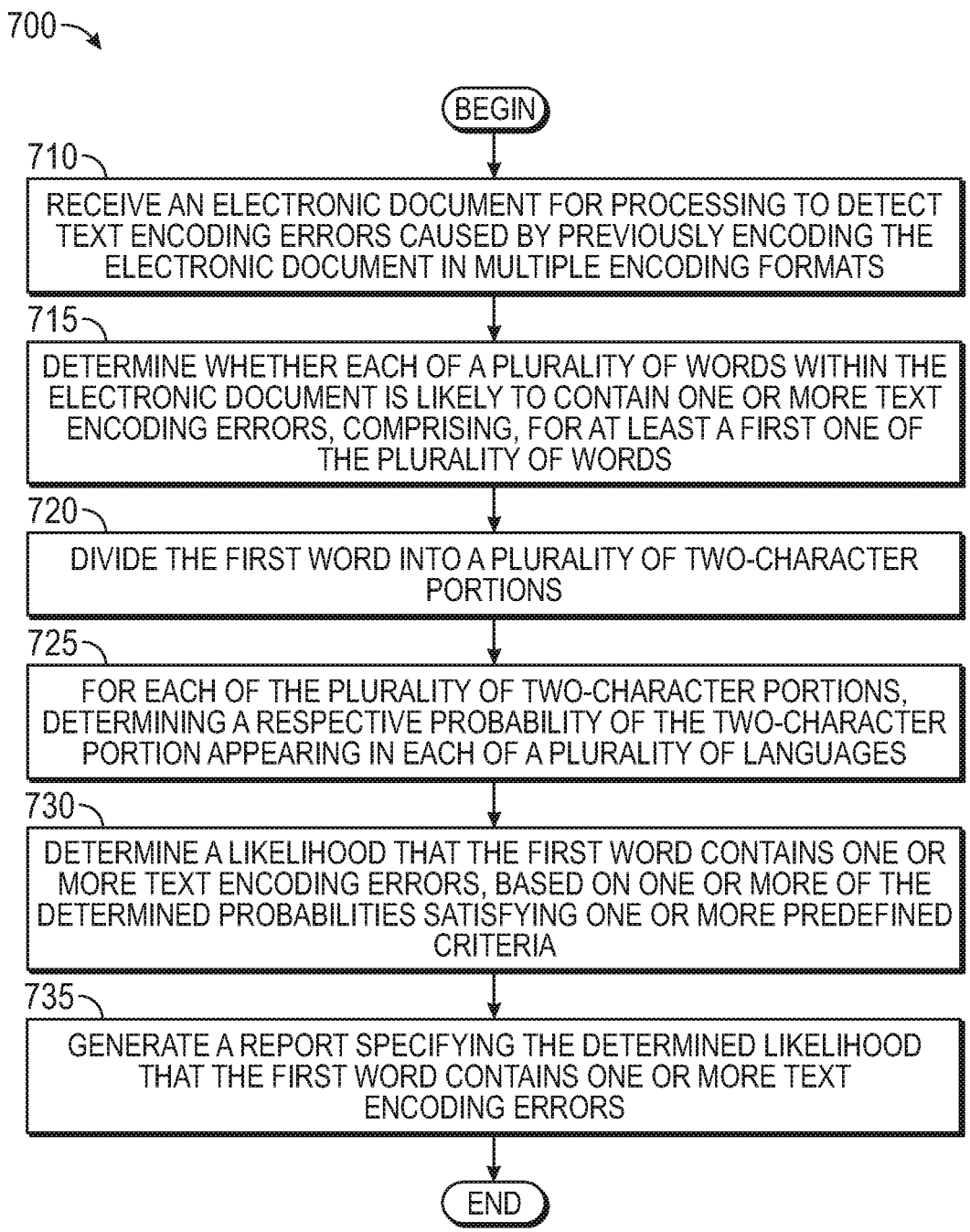
FIG. 7 is a flow diagram illustrating a method of generating a report describing text encoding issues detected within an electronic document, according to one embodiment described herein.

FIG. 7 is a flow diagram illustrating a method of generating a report describing text encoding issues detected within an electronic document, according to one embodiment described herein. As shown, the method 700 begins at block 710, where the text encoding issue detection component 130 receives an electronic document for processing to detect text encoding errors caused by previously encoding the electronic document in multiple encoding formats. The text encoding issue detection component 130 determines whether each of a plurality of words within the electronic document is likely to contain one or more text encoding errors, by, for at least a first one of the plurality of words (block 715), dividing the first word into a plurality of two-character portions (block 720).

For each of the plurality of two-character portions, the text encoding issue detection component 130 determines a respective probability of the two-character portion appearing in each of a plurality of languages (block 725). For example, the query generation component 220 could generate one or more queries for execution against database 272. Generally, such queries could specify one or more of the two-character portions, and the resulting query results could contain the corresponding greatest probability of each of the one or more two-character portions appearing in one of the plurality of languages. In doing so, the query could specify to select a greatest probability value for the two-character portion, across all of the probabilities of the bigram for all of the plurality of languages.

The text encoding issue detection component 130 determines a likelihood that the first word contains one or more text encoding errors, based on one or more of the determined probabilities satisfying one or more predefined criteria (block 730). For example, the text encoding issue detection component 130 could determine whether two or more consecutive two-character portions have probability values less than a predefined threshold level. Additionally, the text encoding issue detection component 130 could determine a confidence value that the first word contains one or more text encoding errors, based on the highest probability value for the two-character portions of the first word. The report generation component 218 generates a report specifying the determined likelihood that the first word contains one or more text encoding errors (block 735), and the method 700 ends.

Figure 8:
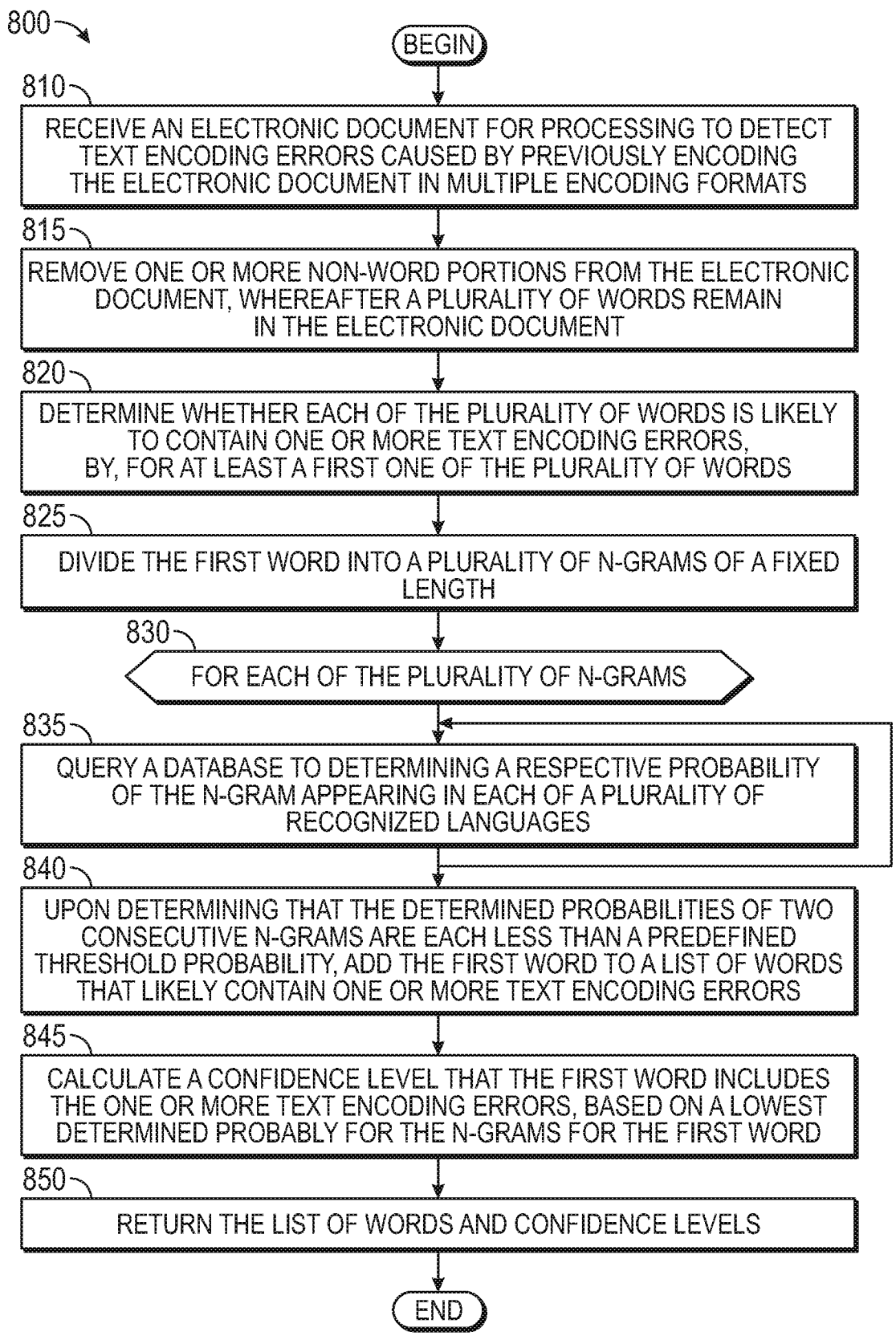
FIG. 8 is a flow diagram illustrating a method of identifying words within an electronic document that are likely to contain a text encoding issue, according to one embodiment described herein.

FIG. 8 is a flow diagram illustrating a method of identifying words within an electronic document that are likely to contain a text encoding issue, according to one embodiment described herein. As shown, the method 800 begins at block 810, where the text encoding issue detection component 130 receives an electronic document for processing to detect text encoding errors caused by previously encoding the electronic document in multiple encoding formats. The document preprocessing component 216 performs a preprocessing operation on the electronic document to remove one or more non-word portions from the electronic document, whereafter a plurality of words remain in the electronic document (block 815).

The text encoding issue detection component 130 determines whether each of the plurality of words is likely to contain one or more text encoding errors, by, for at least a first one of the plurality of words (block 820), dividing the first word into a plurality of n-grams of a fixed length (block 825). The method 800 enters a loop at block 830, where for each of the plurality of n-grams, the query generation component 220 queries a database to determining a respective probability of the n-gram appearing in each of a plurality of recognized languages (block 835).

Upon determining that the determined probabilities of two consecutive n-grams are each less than a predefined threshold probability, the text encoding issue detection component 130 adds the first word to a list of words that likely contain one or more text encoding errors (block 840). Additionally, the text encoding issue detection component 130 calculates a confidence level that the first word includes the one or more text encoding errors, based on a lowest determined probably for the n-grams for the first word (block 845). The text encoding issue detection component 130 returning the list of words and confidence levels (block 850), and the method 800 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the text encoding issue detection component 130) or related data available in the cloud. For example, the text encoding issue detection component 130 could execute on a computing system in the cloud and could receive documents (or content identifiers) for analysis via a provided validation interface 515. In such a case, the text encoding issue detection component 130 could receive text-based content responsive to a query submitted through the validation interface 515 and could perform a mojibake detection operation 525 on the text-based content to identify any words within the text-based content that are likely to contain text encoding errors. The text encoding issue detection component 130 could then output results of the mojibake detection operation 525 (e.g., in the form of a CSV report 565). Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving an electronic document for processing to detect text encoding errors caused by previously encoding the electronic document in multiple encoding formats;
removing one or more non-word portions from the electronic document, whereafter a plurality of words remain in the electronic document;
determining whether each of the plurality of words is likely to contain one or more text encoding errors, comprising, for at least a first one of the plurality of words:
dividing the first word into a first plurality of n-grams of a fixed length of at least 2;
for each of the first plurality of n-grams:
querying a database to determine a respective probability of the n-gram appearing in each of a plurality of recognized languages; and
selecting, from the respective probabilities, a highest probability of the n-gram;
evaluating the highest probabilities of two consecutive n-grams of the first plurality of n-grams;
determining, based on the evaluation, that the highest probabilities of the two consecutive n-grams are each less than a predefined threshold probability;
in response to determining that the highest probabilities of the two consecutive n-grams are each less than the predefined threshold probability, adding the first word to a list of words that likely contain the one or more text encoding errors; and
calculating a confidence level that the first word includes the one or more text encoding errors, based on a lowest determined probability for the first plurality of n-grams for the first word; and
returning the list of words and confidence levels.

2. The method of claim 1, wherein a first one of the non-word portions includes one or more punctuation characters.

3. The method of claim 1, wherein:
the first plurality of n-grams comprise bigrams having a fixed length of 2 characters; and
the first word is divided into n−1 bigrams, where n represents the number of characters in the first word.

4. The method of claim 1, further comprising:
upon determining that a second word in the plurality of words is composed entirely of American Standard Code for Information Interchange (ASCII) characters, determining that the second word does not contain any text encoding errors caused by previously encoding the electronic document in multiple encoding formats.

5. The method of claim 1, wherein the probability of the n-gram is calculated as a ratio of number of times the n-gram occurs in the given language over the total number of n-grams in that language in the database.

6. The method of claim 1, wherein determining whether each of the plurality of words is likely to contain one or more text encoding errors, further comprises, for at least a second one of the plurality of words:
dividing the second word into a second plurality of n-grams of the fixed length; and
for each of the second plurality of n-grams:
querying the database to determine a respective probability of the n-gram appearing in each of the plurality of recognized languages;
upon determining that the determined probabilities of two consecutive n-grams are each less than the predefined threshold probability, determining whether the second word appears on a list of known false positives; and
upon determining that the second word appears on the list of known false positives, omitting the second word from the list of words that likely contain the one or more text encoding errors.

7. The method of claim 1, wherein removing one or more non-word portions from the electronic document further comprises:

upon determining that a first punctuation character in the electronic document satisfies one or more conditional expressions representing proper punctuation usage within documents, removing the first punctuation character from the electronic document; and upon determining that a second punctuation character in the electronic document does not satisfy the one or more conditional expressions representing proper punctuation usage within documents, removing the second punctuation character in the electronic document from consideration as a text encoding error.

8. The method of claim 7, wherein removing one or more non-word portions from the electronic document further comprises:

upon removing a hyphen character from within a second one of the plurality of words, dividing the second word into two separate words.

9. A system, comprising:

one or more computer processors; and a memory containing computer program code that, when executed by operation of the one or more computer processors, performs an operation comprising:

receiving an electronic document for processing to detect text encoding errors caused by previously encoding the electronic document in multiple encoding formats;

dividing each of a plurality of words in the electronic document into a respective plurality of n-grams of length two or more;

determining that at least a first word in the plurality of words is likely to contain one or more text encoding errors, based on the respective plurality of n-grams for the first word, comprising:

for each of the plurality of n-grams for the first word, determining a highest probability of the n-gram appearing in one of a plurality of recognized languages;

evaluating the highest probabilities of two consecutive n-grams of the plurality of n-grams; and determining, based on the evaluation, that the highest probabilities of the two consecutive n-grams of the plurality of n-grams satisfy one or more predetermined criteria for containing one or more text encoding errors; and providing an indication that at least the first word is likely to contain one or more text encoding errors.

10. The system of claim 9, wherein determining that at least the first word in the plurality of words is likely to contain one or more text encoding errors, based on the respective plurality of n-grams for the first word comprises, for each of the plurality of n-grams, querying a database to determine a respective probability of the n-gram appearing in each of the plurality of recognized languages, wherein the highest probability is determined from the respective probabilities.

11. The system of claim 10, wherein the probability of the n-gram appearing in each of the plurality of recognized languages is calculated as a ratio of number of times the n-gram occurs in the given language over the total number of n-grams in that language in the database.

12. The system of claim 9, wherein determining that at least the first word in the plurality of words is likely to contain one or more text encoding errors, based on the respective plurality of n-grams for the first word comprises, upon determining that the highest probabilities of the two consecutive n-grams are each less than a predefined threshold probability:

adding the first word to a list of words that likely contain the one or more text encoding errors; and calculating a confidence level that the first word includes the one or more text encoding errors, based on a lowest determined probability for the n-grams for the first word.

13. The system of claim 9, the operation further comprising removing one or more non-word portions from the electronic document, whereafter a plurality of words remain in the electronic document.

14. The system of claim 9, wherein the n-grams further comprise bigrams having a fixed length of 2 characters, and wherein each word is divided into n−1 bigrams, where n represents the number of characters in the word.

15. A non-transitory computer-readable medium containing computer program code that, when executed by operation of one or more computer processors, performs an operation comprising:

receiving an electronic document for processing to detect text encoding errors caused by previously encoding the electronic document in multiple encoding formats;

determining whether each of a plurality of words within the electronic document is likely to contain one or more text encoding errors, comprising, for at least a first one of the plurality of words:

dividing the first word into a plurality of two-character portions;

for each of the plurality of two-character portions:

determining a respective probability of the two-character portion appearing in each of a plurality of languages; and selecting, from the respective probabilities, a highest probability of the two-character portion; and determining a likelihood that the first word contains one or more text encoding errors, based on the highest probabilities of two consecutive two-character portions of the plurality of two-character portions satisfying one or more predefined criteria for containing one or more text encoding errors; and generating a report specifying the determined likelihood that the first word contains one or more text encoding errors.

16. The non-transitory computer-readable medium of claim 15, the operation further comprising:

removing one or more punctuation characters from the electronic document, prior to dividing the first word into the plurality of two-character portions.

17. The non-transitory computer-readable medium of claim 15, the operation further comprising:

adding the first word to a list of words that likely contain one or more text encoding errors.

18. The non-transitory computer-readable medium of claim 15, wherein the one or more predefined criteria comprises the consecutive two of the highest probabilities not exceeding a predefined threshold level of confidence.

19. The non-transitory computer-readable medium of claim 18, the operation further comprising:

normalizing character representations of one or more characters within the electronic document, prior to determining whether each of the plurality of words within the electronic document is likely to contain one or more text encoding errors.

20. The non-transitory computer-readable medium of claim 15, wherein determining the respective probability of the two-character portion appearing in each of a plurality of languages further comprises:
  generating a database query to determine the respective probability of the two-character portion appearing in each of the plurality of languages;
  submitting the database query for execution against a database; and
  receiving query results specifying the respective probability of the two-character portion appearing in each of the plurality of languages.

\* \* \* \* \*